United States Patent Office 3,206,435
Patented Sept. 14, 1965

---

3,206,435
PROCESS FOR THE PREPARATION OF
TANNING RESINS
Rudi Heyden and Jurgen Plapper, Dusseldorf, Germany, assignors to Böhme Fettchemie G.m.b.H., Dusseldorf, Germany, a corporation of Germany
No Drawing. Filed Mar. 20, 1961, Ser. No. 96,659
Claims priority, application Germany, Mar. 22, 1960, B 57,150
5 Claims. (Cl. 260—67.6)

This invention relates to resinous tanning agents obtained by preparing mixed condensates of dicyandiamide and melamine with an aldehyde and neutral salts of organic sulfonic acids.

It is known that by condensation of dicyandiamide and formaldehyde it is possible to obtain resinous condensation products which may be used as such, as tanning resins, or in combination with other known tanning agents for the preparation of leather. It is further known that these resin condensates, if they are obtained in a water insoluble form, may be transformed into solutions by the addition of non-acidic water-soluble salts of organic sulfonic acids, especially of aromatic sulfonic acids, and that these solutions may be employed as tanning agents. The tanning effects achieved therewith possess certain disadvantages in that their fixation in the skin requires a very difficult adjustment of the optimum precipitation condition, and in that leather is obtained therewith which is still not completely satisfactory with respect to the grain.

It is an object of this invention to provide a new resinous tanning agent produced for mixed condensates of dicyandiamide and melamine, with an aldehyde and neutral salts of organic sulfonic acids.

A further object of this invention is to produce a resinous tanning agent which may be precipitated in the skin to be tanned within an easily controllable range of precipitation conditions.

Another object is to provide a resinous tanning agent which produces a leather of fine grain.

These and other objects of our invention will become apparent as the description thereof proceeds.

We have now found that resinous agents of considerably better quality are obtained by preparing mixed condensates of dicyandiamide and melamine with an aldehyde, especially formaldehyde, and neutral salts of organic sulfonic acids, especially of aromatic sulfonic acids. These mixed condensates have the property of being precipitated completely within a relatively small acid pH range, and that they produce leather which has a particularly fine grain, such as has not been achieved heretofore by means of the tanning resins known in the art.

For the preparation of these novel condensates, mixtures of dicyandiamide and melamine in a molar ratio of 0.35 to 0.60 dicyandiamide, 0.40 and 0.65 melamine, are condensed with 2.5 to 4.5 mols of formaldehyde at temperatures between 50 and 100° C., preferably 80° C. for ½ to 3 hours. During this consendation, 0.2 to 0.4 mol of a neutral salt of an aromatic sulfonic acid are added from the beginning, but this addition may also take place during a later stage of the reaction.

It has been determined that it is particularly advantageous to control the condensation in such a manner that condensates are formed from the dicyandiamide-melamine-formaldehyde mixtures which are soluble at least in warm water. These condensates have the property of not being precipitated at pH values above 6 to 7 by solutions of salts of aromatic sulfonic acids. However, the precipitation takes place immediately as soon as the pH value drops to 5.5 to 4.5 or lower. This property is characteristic for the above-mentioned condensates, but the process leads to particularly advantageous resins if the salts of aromatic sulfonic acids are from the beginning incorporated into the reaction mixture, after the condensation conditions for the above mixture have been determined.

As starting materials for the tanning resins according to the invention, it is possible to use not only melamine but also its substitution products, such as alkylmelamines, alkylolmelamines, melam, melem, melone or similar acting triazine derivatives, such as ammelide, ammeline, and the like. Furthermore, it is possible to use, instead of formaldehyde, other aldehydes, such as acetaldehyde, or substances which release formaldehyde. Primarily suitable as salts of organic sulfonic acids are the neutral alkali metal salts of aromatic sulfonic acids, such as those of benzene sulfonic acids, phenol sulfonic acids, naphthalene sulfonic acids, sulfonated phenolformaldehyde condensates, sulfonated dihydroxy-diphenylmethane, sulfonated dihydroxy - diphenylpropane, sulfonated dihydroxy - diphenylsulfones and the like. Furthermore, it is possible to employ other aminoplast-forming substances, such as urea, cyanamide, etc., as additional starting materials or as partial replacements for the melamine and/or dicyandiamide.

The drying of the resin solution thus obtained may be effected according to customary processes, such as by evaporation in vacuo, by evaporation on a drying roll or by spray drying. The end products obtained thereby are dry, storable powders. They are water-soluble and may be precipitated by acidification. They may be employed in a manner customary for tanning resins, that is, primarily in combination-tanning with mineral-tanning agents, especially with chrome-tanning agents. The resin tannage may be employed as a preliminary tannage or preferably as a retanning procedure. After tanning, the leather is treated in the customary fashion and is then fat-liquored.

The resins have the great advantage that they are capable of being precipitated in a pH range between 4.2 and 5.2 by means of an acid. By virtue of this property, the deposition of the resin in the leather may conveniently be controlled by neutralization after chrome-tanning. Depending upon the de-acidification condition of the leather, a superficial deposition of the resin or also a more or less deep penetration may be achieved. It is obvious that the control of the resin precipitation is easier the more narrow the pH range is, in which a complete precipitation takes place.

The novel tanning resins are useful for tanning skins of all types, such as cowhides, calfskins, sheepskins, and goatskins as well as for tanning skins and furs of game animals.

The following examples are set forth to further illustrate our invention and to enable persons skilled in the art to better understand and practice our invention, and are not intended to be limitative.

*Example I*

31.5 parts by weight of melamine (0.25 mol),
21.0 parts by weight of dicyandiamide (0.25 mol),
54.0 parts by weight of dinaphthylmethane-sodium disulfonate (0.12 mol)

were heated with 187 parts by weight of a 30% formaldehyde solution (1.875 mol) for ½ hour in a reflux cooler at 80° C., and the reaction solution was then dried by spray drying. A water-soluble resin powder was obtained. The resin can be precipitated from aqueous solution by acidification.

*Example II*

63 parts by weight of melamine (0.5 mol),
42 parts by weight of dicyandiamide (0.5 mol), 375 parts by weight of a 30% formaldehyde solution (3.75 mols)

were heated at 80° C. for 30 minutes while stirring, and the mixture was then evaporated under reduced pressure at 40° C. A colorless resin was obtained which was readily soluble in warm water. The dry, water-soluble resin powder was admixed with 108 parts by weight (0.23 mol) of dry dinaphthyl-methane-disodium sulfate. The mixed product was soluble in water and could be precipitated with acid. The principal amount of the resin preciptated out between a pH of 3.9 and 4.2.

*Example III*

63 parts by weight of melamine (0.5 mol),
42 parts by weight of dicyandiamide (0.5 mol),
375 parts by weight of a 30% formaldehyde solution (3.75 mols)

were refluxed for 2 hours at 80° C. while stirring, and then 108 parts by weight of dinaphthylmethane-disodium sulfonate (0.23 mol) were added thereto. The resulting mixture was refluxed for another 15 minutes at 80° C. Thereafter, the product was evaporated in vacuo. A clear, water-soluble resin powder was obtained.

*Example IV*

27.8 parts by weight of dicyandiamide (0.33 mol),
84.0 parts by weight of melamine (0.67 mol),
108.0 parts by weight of dinaphthylmethane-disodium sulfonate (0.23 mol)
375.0 parts by weight of a 30% formaldehyde solution (3.75 mols)

were heated for 30 minutes at 80° C. while strring, and the resulting mixture was evaporated under reduced pressure. A water-soluble resin was obtain, which precipitated from solution to a major extent by being acidified between a pH of 5.0 and 5.5.

*Example V*

31.5 parts by weight of melamine (0.25 mol),
21.0 parts by weight of dicyandiamide (0.25 mol),
54.0 parts by weight of dinaphthylmethane-disodium sulfonate (0.115 mol),
125.0 parts by weight of a 30% formaldehyde solution (1.25 mols)

were refluxed for 30 minutes at 80° C. The resin solution was then dried by spray drying. A water-soluble resin powder was obtained, the principal amount of which preciptated from solution bewteen a pH of 5.0 and 5.5.

*Example VI*

63 parts by weights of melamine (0.5 mol),
41 parts by weight of dicyandiamide (0.5 mol)
108 parts by weight of dinaphthylmethane-disodium sulfonate (0.23 mol)

were dissolved in 450 parts by weight of a 30% formaldehyde solution (4.5 mol), and the resulting solution was heated for 30 minutes at 80° C. Thereafter, the solution was evaporated in vacuo. A water-soluble resin was obtained, the principal amount of which precipitated from solution between a pH of 4.3 and 4.5.

*Example VII*

14.0 parts by weight of urea (0.25 mol),
94.5 parts by weight of melamine (0.75 mol),
108.0 parts by weight of dinaphthylmethane-disodium sulfonate (0.23 mol)

were dissolved in 375.0 parts by weight of a 30% formaldehyde solution (3.75 mols). The solution was adjusted to a pH of 8 with sodium hydroxide, and was then heated at 80° C. for 20 minutes. The cooled solution of the condensate was dried by spray drying in the customary manner. A water-soluble resin powder was obtained which precipitated from its aqueous solution at a pH of 5.7 to 4.7.

*Example VIII*

21.0 parts by weight of dicyandiamide (0.25 mol),
31.5 parts by weight of melamine (0.25 mol),
30.75 parts by weight of 2-naphthol-6-sodium sulfonate (0.25 mol)

were admixed with 187.5 parts by weight of a 30% formaldehyde solution, and the resulting mixture was condensed at 85° C. for 20 minutes. After spray drying, a water-soluble resin powder was obtained, the principal amount of which precipitated from its aqueous solution at a pH between 5.5 and 4.5.

*Example IX*

82.0 parts by weight of melamine (0.65 mol)
30.0 parts by weight of ethyleneurea (0.35 mol),
108.0 parts by weight of dinaphthylmethane-disodium sulfonate (0.23 mol)

were dissolved in 375 parts by weight of a 30% formaldehyde solution and the solution was condensed at 80 to 85° C. for 20 minutes. Thereafter, the resin was dried by spray drying in the usual manner. A water-soluble resin powder was obtained, the principal amount of which was precipated from aqueous solution by acid at a pH of 5.5 to 4.5.

The following examples illustrate that the resins according to the invention are useful as tanning resins. The processes described in these examples are useful for the treatment of all chrome-tanned upper leathers, such as boxsides, boxcalf, kid leather, as well as for apparel leather and other types of chrome-tanned leathers. Depending upon the type of leather, the preparation of the leather may involve a fat-liquoring step prior to the resin tannage or, as in many cases, such as with kid, may involve only one fat-liquoring step subsequent to tanning. The percentages refer to the split weight of the skins.

*Example X*

Chrome-tanned cowhides, split to a thickness of 1.5 to 2.5 mm., and neutralized in the usual manner with about 1.0% of sodium bicarbonate, were retanned with the solution:

100% water at 60° C.
4–6% acid-precipitatable resin according to Example I
Running time: 40 minutes.

Thereafter, the tanning solution was acidified with 1 to 3% boric acid. The leather was then fat-liquored in the same bath with 4 to 5% of pure fat with the aid of commercial fat-liquoring agents. After the customary finishing steps, a leather was obtained which has a clear grain and good fullness, the chrome-tanned characteristics of the leather being retained.

*Example XI*

After neutralization with about 1.0% sodium bicarbonate, chrome-tanned box sides were treated with the solution:

100% water at 60° C.
3% acid-precipitatable resin according to Example III
Running time: 20 minutes.
Then acidification with 1 to 2% boric acid
Additional running time: 10 minutes.

Thereafter, an additional 3% of acid-precipitatable resin was added and the tanning was allowed to proceed for an additional 20 minutes. Subsequently, the tanning solution was acidified with 1 to 2% boric acid. Additional running time: 10 minutes.

Fat-liquoring was effected with 4 to 5% pure fat, as in Example X. Box sides were obtained having good fullness, more complete deposition of the resin tanning agent in the leather surface, very smooth leather and the best polishing characteristics. The resin of Example IX was used as above with comparable results.

*Example XII*

After neutralization as in Example VII, chrome-tanned box side was retanned with the solution:

100% water at 60° C.
4-6% acid-precipitatable resin according to Example IV
Running time: 40 minutes.

Thereafter, 1.5 to 2.0% chromium oxide (as 33% basic chrome-tanned agent) were added to the same bath. Additional running time: 60 minutes.

The leather was rinsed briefly at 60° C. and fat-liquored in a new bath, as in Example X. Leather with good fullness and pure chrome-tanned characteristics, and a clear, smooth grain was obtained.

*Example XIII*

Chrome-tanned box side was neutralized as described in Example X, and was retanned with the solution:

100% water at 60° C.
4-6% acid-precipitatable resin according to Example VI
Running time: 40 minutes.

Then the following agents were added to the tanning bath: 0.5% chromium oxide (as 33% basic chrome-tanning agent) and 5 to 10% of commercial synthetic white tanning agent.

In the event that the synthetic white tanning agent is not compatible with the chrome-tanning agent, the two tanning agents are not added simultaneously; instead, the synthetic white tanning agent is added only after a running time of about 10 minutes of the chrome-tanning agent. If the white tanning agent is compatible with the chrome-tanning agent, the latter may be added simultaneously with the synthetic tanning agent to the tanning bath.

After the customary finishing treatments, smooth white leather uppers with good fullness and clear grain were obtained. The resin of Example VII was used as above with comparable results.

*Example XIV*

Thin, chrome-tanned box side splits of a thickness of 1.2 to 1.5 mm. were pretreated with 3% of a tanning agent which contained masking salts and partially neutralized synthetic commercial tanning assistants in a solution:

70-100% water at 20° C.
Running time: 20 minutes

Thereafter, addition of:

0.5% sodium bicarbonate
Running time: 40 minutes
Rinsing at 60° C.

Thereafter, fat-liquoring in the usual manner with the solution:

250% water at 60° C.
6 to 8% of pure fat of a commercial fat-liquoring agent for soft, apparel-type leather.

After a running time of about 40 minutes, 2 to 3% of acid precipitatable resin according to Example I was added to the fat-liquoring solution. Additional running time: 20 minutes.

Thereafter, 2% of a commercial synthetic white tanning agent was added. Running time: 20 minutes.

After the customary finishing treatment of the leather, thin, soft, smooth uppers with clear grain (softy-type) were obtained which were suitable for apparel leather and also for white leather.

*Example XV*

Chrome-tanned cowhide splits of a thickness of 1.5 to 2.5 mm. were retanned with highly basic, possibly strongly masked, chrome-tanning agents, and were buffered to a pH value of about 4.5. Thereafter, they were rinsed at 60° C. and then treated with the solution:

100% water at 60° C.
2 to 3% acid-precipitatable resin according to Example I
Running time: 40 minutes.

The leather was then fat-liquored with 4 to 5% pure fat in the usual manner. After the customary finishing treatment, a very full leather was obtained which, in contrast to leather retanned only with highly basic chrome-tanning agents, had a particularly clear and fine grain. The resin of Example VIII was used as above with the comparable results.

While we have set forth certain specific examples and preferred modes of practice of our invention, we wish it to be understood that we do not intend to be limited thereby and that various changes and modifications may be made in the invention without departing from the spirit of the disclosure or the scope of the appended claims.

We claim:

1. Process for the preparation of tanning resins which are substantially completely precipitatable in a narrow range of about one pH number comprising the steps of forming a condensation product in an aqueous medium of (1) 0.40 to 0.65 mol of melamine, (2) 0.35 to 0.60 mol of a dicyandiamide and (3) 2.5 to 4.5 mols of a lower aliphatic aldehyde in combination with (4) 0.2 to 0.4 mol neutral alkali metal salts of a low molecular aromatic sulfonic acid at temperatures from about 50 to 100° C. for a period of from about ½ to about 3 hours and drying the condensation product.

2. The process of claim 1 wherein the aldehyde is formaldehyde.

3. Process for the preparation of tanning resins which are substantially completely precipitatable in a narrow range of about one pH number comprising the steps of forming a condensation product in an aqueous medium of (1) 0.40 to 0.65 mol of melamine, (2) 0.35 to 0.60 mol of dicyandiamide and (3) 2.5 to 4.5 mols of a lower aliphatic aldehyde, at temperatures from about 50 to 100° C. for a period of about ½ to 3 hours, admixing with the condensation product 0.2 to 0.4 mol of a neutral alkali metal salt of a low molecular aromatic sulfonic acid, and drying the resulting condensation product.

4. Process for the preparation of tanning resins which are substantially completely precipitatable in a narrow range of about one pH number comprising the steps of forming a condensation product in an aqueous medium of (1) 0.40 to 0.65 mol of melamine, (2) 0.35 to 0.60 mol of dicyandiamide and (3) 2.5 to 4.5 mols of formaldehyde in aqueous solution with the addition of (4) 0.2 to 0.4 mol neutral alkali metal salts of a low molecular aromatic sulfonic acid prior to and during said condensation, conducting the condensation at temperatures from about 50 to about 100° C. for a period of from about ½ to about 3 hours, and drying the condensation product.

5. Process for the preparation of tanning resins which are substantially completely precipitatable in a narrow range of about one pH number comprising the steps of forming a condensation product in an aqueous medium of (1) 0.40 to 0.65 mol of melamine, (2) 0.35 to 0.60 mol of dicyandiamide and (3) 2.5 to 4.5 mol of a lower aliphatic aldehyde, in combination with (4) 0.2 to 0.4 mol of neutral alkali metal salts of a low molecular aromatic sulfonic acid, conducting the condensation at temperatures from about 50 to about 100° C. for a period of from about ½ to about 3 hours, said time and temperature being adjusted to obtain resins precipitatable from their aqueous solutions at a pH not greater than 5.5, and drying the condensation product.

(References on following page)

References Cited by the Examiner

UNITED STATES PATENTS

| | | | |
|---|---|---|---|
| 2,550,639 | 4/51 | Dawson | 8—94.21 |
| 2,701,749 | 2/55 | Nagy | 8—94.24 |
| 2,709,693 | 5/55 | Widmer | 260—67.6 |
| 2,730,516 | 1/56 | Suen et al. | 260—67.6 |
| 2,733,977 | 2/56 | Meister et al. | 8—94.24 |
| 2,852,489 | 9/58 | Anas | 260—67.6 |
| 2,884,403 | 4/59 | Zorn et al. | 260—69 |
| 2,944,046 | 7/60 | Sellet | 260—67.6 |
| 2,970,033 | 1/61 | Edmonds et al. | 8—94.33 |

FOREIGN PATENTS 1,050,541  2/59  Germany.

WILLIAM H. SHORT, *Primary Examiner.*

H. PACCIAPAGLIA, HAROLD N. BURNSTEIN,
*Examiners.*